United States Patent
Sun et al.

(10) Patent No.: US 9,989,668 B2
(45) Date of Patent: Jun. 5, 2018

(54) INSPECTION SYSTEM FOR CONTAINER

(71) Applicant: Nuctech Company Limited, Haidian District, Beijing (CN)

(72) Inventors: Shangmin Sun, Beijing (CN); Weifeng Yu, Beijing (CN); Liwei Song, Beijing (CN)

(73) Assignee: Nuctech Company Limited, Haidian District, Beijing (CN)

( * ) Notice: Subject to any disclaimer, the term of this patent is extended or adjusted under 35 U.S.C. 154(b) by 216 days.

(21) Appl. No.: 14/576,715

(22) Filed: Dec. 19, 2014

(65) Prior Publication Data

US 2015/0204999 A1    Jul. 23, 2015

(30) Foreign Application Priority Data

Jan. 22, 2014  (CN) .......................... 2014 1 0031016

(51) Int. Cl.
*G01N 23/04*   (2018.01)
*G01V 5/00*    (2006.01)

(52) U.S. Cl.
CPC ................................. *G01V 5/0016* (2013.01)

(58) Field of Classification Search
CPC .... G01V 5/0016; G01V 5/005; G01V 5/0008; G01V 5/0041; G01V 5/0066; G01V 5/0075; G01V 5/0025; G01V 5/00; G01V 5/0058; G01V 5/0091; G01V 5/0033; G01V 23/04; G01V 22/00; G01V 2223/076; G01N 2223/419; G01N 23/046; G01N 2223/076; G01N 23/223; G01N 21/9508; G01N 23/04; G01N 15/02; G01N 15/04; G01N 23/06; G01N 23/10; G01N 35/10; G01N 2223/3304; G01N 23/20; G01N 23/20083;
(Continued)

(56) References Cited

U.S. PATENT DOCUMENTS

| | | | | |
|---|---|---|---|---|
| 6,058,158 A | * | 5/2000 | Eiler | ..................... B66C 19/007 378/197 |
| 7,486,768 B2 | * | 2/2009 | Allman | ................ G01V 5/0008 378/147 |

(Continued)

FOREIGN PATENT DOCUMENTS

| CN | 2383067 Y | 6/2000 |
|---|---|---|
| CN | 1304037 A | 7/2001 |

(Continued)

OTHER PUBLICATIONS

Chinese Office Action for corresponding Chinese Patent Application No. 201410031016.9 dated Nov. 15, 2016, 8 pgs.

(Continued)

*Primary Examiner* — Irakli Kiknadze
(74) *Attorney, Agent, or Firm* — Merchant & Gould P.C.

(57) ABSTRACT

The present invention provides an inspection system for a container. It comprises: a radiation source, configured to provide X-rays for scanning the container; a detector, configured to receive the X-rays emitted from the radiation source; a body of the inspection system, on which the radiation source and the detector are provided; wherein a size of the body of the inspection system is set to facilitate the inspection of the container. The inspection system of the present invention can inspect in batches the container in the wharf or goods yard.

13 Claims, 21 Drawing Sheets

(58) Field of Classification Search
CPC ...... G01N 22/00; B66C 19/002; B66C 13/08;
B66C 13/16; B66C 13/46; B66C 19/007;
B66C 1/101; B66C 7/12; B66C 13/00;
B66C 15/06; B66C 19/02; B66C 1/663;
A61B 6/00; A61B 6/032; A61B 6/035;
A61B 6/04; A61B 6/06; A61B 6/107;
A61B 6/4028; A61B 6/4291; A61B
6/4464; A61B 6/482; A61B 6/50; A61B
6/548; B64F 5/0045; B64F 5/60
USPC .............. 378/4, 19, 57, 51, 197, 198, 53, 55
See application file for complete search history.

(56) References Cited

U.S. PATENT DOCUMENTS

| 7,762,760 | B2* | 7/2010 | Takehara | ............. | B65G 63/004 |
| | | | | | 212/325 |
| 2006/0018735 | A1 | 1/2006 | Takehara et al. | | |
| 2009/0116614 | A1* | 5/2009 | Kotowski | ............. | G01N 23/04 |
| | | | | | 378/57 |
| 2011/0038453 | A1* | 2/2011 | Morton | ................ | G01V 5/0066 |
| | | | | | 378/57 |
| 2013/0177134 | A1* | 7/2013 | Tay | ..................... | G01V 5/0016 |
| | | | | | 378/57 |

FOREIGN PATENT DOCUMENTS

| CN | 101911103 A | 12/2010 |
| CN | 203705662 U | 7/2014 |

OTHER PUBLICATIONS

Second Chinese Office Action for corresponding Chinese Patent Application No. 201410031016.9 dated Jul. 17, 2017, 6 pages. (Rejecting all claims over CN1304037A and the Luo reference.).
Luo, S., "Nuclear Engineering Application", Harbin Engineering University Press, 1st Edition, Oct. 2009, English translation of relevant parts, 4 pages.

* cited by examiner

INSPECTION SYSTEM FOR CONTAINER

CROSS-REFERENCE TO RELATED APPLICATION

This application claims the benefit of Chinese Patent Applications No. 201410031016.9 filed on Jan. 22, 2014 in the State Intellectual Property Office of China, the disclosure of which is incorporated herein by reference.

BACKGROUND OF THE INVENTION

1. Field of the Invention

The present invention relates to an inspection system for a container.

2. Description of the Related Art

A large-scale inspection system for the container in the prior art has the following structures: a radiation source disposed within an inspection passage for shielding rays, which is capable of generating high-energetic X-rays; a detector array, for receiving the X-rays penetrating the container; and a specialized dragging equipment, which is provided to drag vehicles carrying with the containers through the inspection passage. When the container passes through the inspection passage, the radiation source provides the X-rays for inspecting the container. Such inspection system is relatively bulky, since its inspection passage at least has a length of 60 meters, and two ends of its exterior at least have a length of 40 meters respectively. Such system exists the drawbacks such as civil engineering covers a large area, the system engineering has a high manufacturing cost, it is not readily to be repaired and cannot inspect randomly off-site.

A Chinese patent publication CN101911103A discloses a container inspection system for inspecting transportation containers. It includes at least one detection device, which is located within the transportation container; a computer communication network, including an electronic communication tool for receiving at least one comparative data set from the at least one detection device, the data set being selected from a group consisted of an initial data set, an objective data set and one or more selectable temporary data set; a tool responding to the at least one comparative data set, which is configured to determine an inspection failure state of the transportation container; a tool for indicating a further inspection of the transportation container to be preformed for the user, in response to a receipt of the inspection failure state.

The above apparatuses all cannot conveniently, effectively and in batches inspect the containers at a wharf or goods yard.

SUMMARY OF THE INVENTION

The present invention aims to solve at least one aspect of the above problems and drawbacks in the prior art.

In order to overcome at least one of the problems existing in the prior art, the present invention provides an inspection system for a container, the inspection system comprises: a radiation source, which is configured to provide X-rays for scanning the container; a detector, which is configured to receive the X-rays emitted from the radiation source; a body of the inspection system, on which the radiation source and the detector are provided; wherein a size of the body of the inspection system is set to facilitate the inspection of the container.

Preferably, the body of the inspection system is a movable vehicle body.

Preferably, the movable vehicle body comprises a frame, a height of which is adjusted depending on a height of the container; the detector comprises a transversal detector arm located on a transversal upper portion of the frame and a longitudinal detector arm located on a longitudinal side of the frame; and the radiation source is provided on another longitudinal side of the frame.

Preferably, the inspection system further comprises: a movable driving device, which is configured to drive and move the movable vehicle body; a radiation source driving device, which is configured to drive the radiation source to move along a height direction of the frame; and a detector driving device, which is configured to drive the detector to move along the height direction of the frame.

Preferably, the inspection system further comprises: a radiation source deflection driving device and a detector deflection driving device, which respectively drive the radiation source and the detector to deflect by a small angle around a gyration centre, so that the X-rays is angled with the container.

In accordance with another embodiment of the present invention, the movable vehicle body comprises a frame; the detector is a longitudinal detector, which is located at a longitudinal side of the frame, the radiation source is located at another longitudinal side of the frame, during the inspection process, the container is located between the two longitudinal sides.

Preferably, the inspection system further comprises: a movable driving device, which is configured to drive and move the movable vehicle body; a radiation source driving device, which is configured to drive the radiation source to move along a height direction of the frame; and a detector driving device, which is configured to drive the detector to move along the height direction of the frame.

Preferably, the inspection system further comprises: a radiation source deflection driving device and a detector deflection driving device, which respectively drive the radiation source and the detector to deflect by a small angle around a gyration centre, so that the X-rays is angled with the container.

Preferably, the frame reaches a topmost container position in a container stack along a longitudinal direction, so that the inspection system is capable of inspecting the container stacked at the topmost container position of the container stack.

In accordance with a yet further embodiment of the present invention, the movable vehicle body comprises a frame, and a crane device, which is configured to move the container along a height direction of the frame; the detector is a transversal detector, which is provided at a longitudinal side of the frame, an extending direction of the transversal detector is perpendicular to the height direction of the frame, the radiation source is located at another longitudinal side of the frame, during the inspection process, the container is located between the two longitudinal sides.

Preferably, the frame is provided with a slide rail, which extends along a direction of the transversal detector, and the transversal detector is configured to move along the slide rail.

Preferably, the inspection system further comprises: a movable driving device, which is configured to drive and move the movable vehicle body; a radiation source driving device, which is configured to drive and move the radiation source; and a detector driving device, which is configured to drive and move the detector, wherein the detector driving device drives the transversal detector to move along the slide rail.

Preferably, a length of the transversal detector is configured to receive the X-rays transmitting through an entire length of the container.

Preferably, a length of the transversal detector is configured to be capable of receive the X-rays transmitting through half a length of the container.

Preferably, the radiation source driving device is provided to drive the radiation source to rotate in a fixed angle.

Preferably, the radiation source has one target or two targets for generating X-rays.

Preferably, the radiation source generates single energy rays or dual energy rays.

The inspection system provided by the present invention can conveniently, effectively and in batches inspect the containers at a wharf or goods yard.

BRIEF DESCRIPTION OF THE DRAWINGS

These and other aspects as well as advantages of the present invention will become apparent and readily understood from the description of the preferred embodiments taking in conjunction with the accompanying drawings, in which like reference numerals represent like components.

DETAILED DESCRIPTION OF THE EMBODIMENTS

Figure 1:
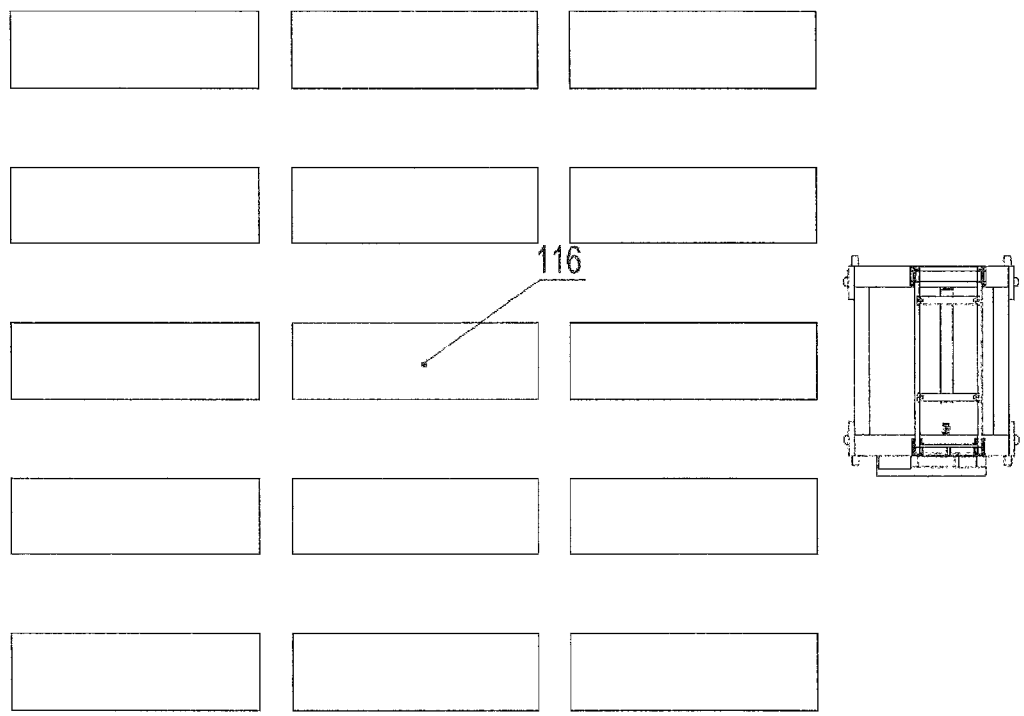
FIG. 1 is a schematic view of a wharf or a goods yard, showing out a plurality of container to be inspected placed therein.

Technical solutions of the present invention will be described hereinafter in more detail by the way of embodiment with reference to FIGS. 1-27 of the attached drawings, wherein the same or like reference numerals refer to the same or like elements throughout the specification. The explanation to the embodiment of the present invention with reference to the accompanying drawings is intended to interpret the general inventive concept of the present invention, rather than being construed as a limiting to the present invention.

FIG. 1 is a schematic view of a wharf and goods yard, showing that containers to be inspected are placed within the wharf and goods yard. The container to be inspected is figured with a reference number 116. It can be seen from FIG. 1 that in order to save the placement space, a distance between two adjacent containers is set to be small. Therefore, the inspection system in the prior art cannot conveniently, quickly and in batches inspect the container in such condition.

Figure 2:
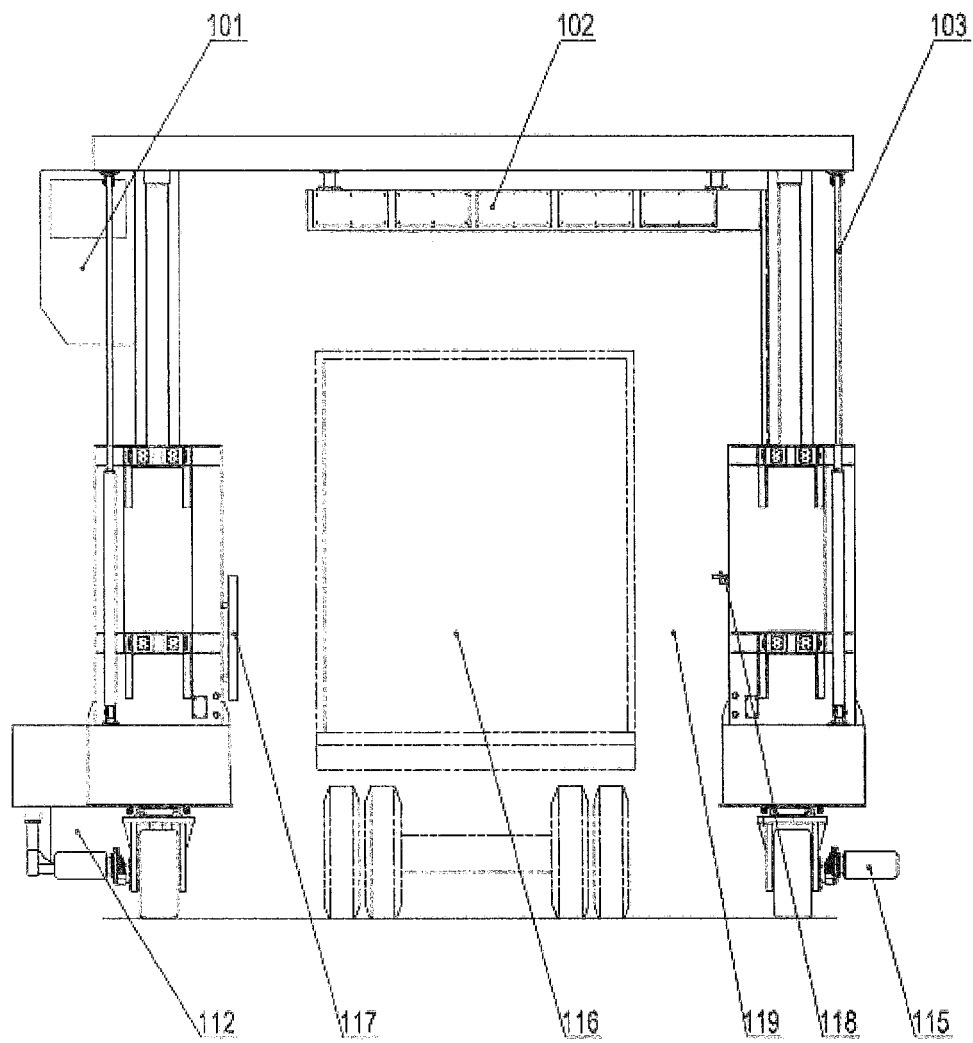
FIG. 2 is a front view of an inspection system in accordance with one embodiment of the present invention.

FIG. 2 is a front view of an inspection system in accordance with an embodiment of the present invention. As shown, the inspection system in accordance with the present invention includes: a radiation source 112, for providing X-rays to scan the containers 116; a detector, for receiving the X-rays emitted from the radiation source 112; a body of the inspection system, on which the radiation source 112 and the detector are disposed, wherein a size of the body is arranged to facilitate the inspection to the containers. That is, as shown in FIG. 2, the inspection system is of a movable type or a fixed type. The size of the body is set to span across the container, so that it is convenient to inspect the container. Obviously, FIGS. 4 and 5 respectively show a schematic view of scanning the container with the fixed type and movable inspection systems. In the fixed type inspection system as shown in FIG. 4, the containers are carried by the vehicle to pass through it; whereas the movable type inspection system of FIG. 5 moves over the container.

Figure 3:
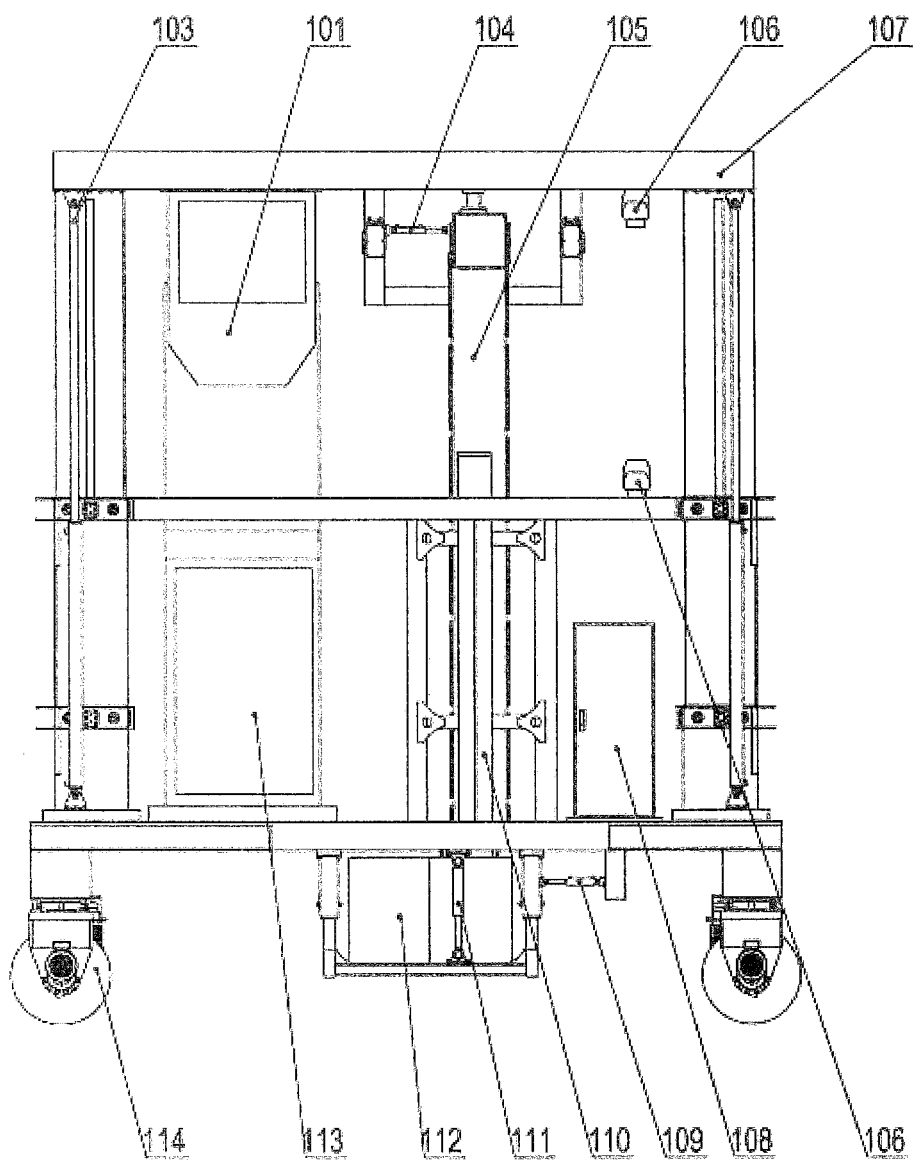
FIG. 3 is a side view of the inspection system of FIG. 2.
Figure 4:
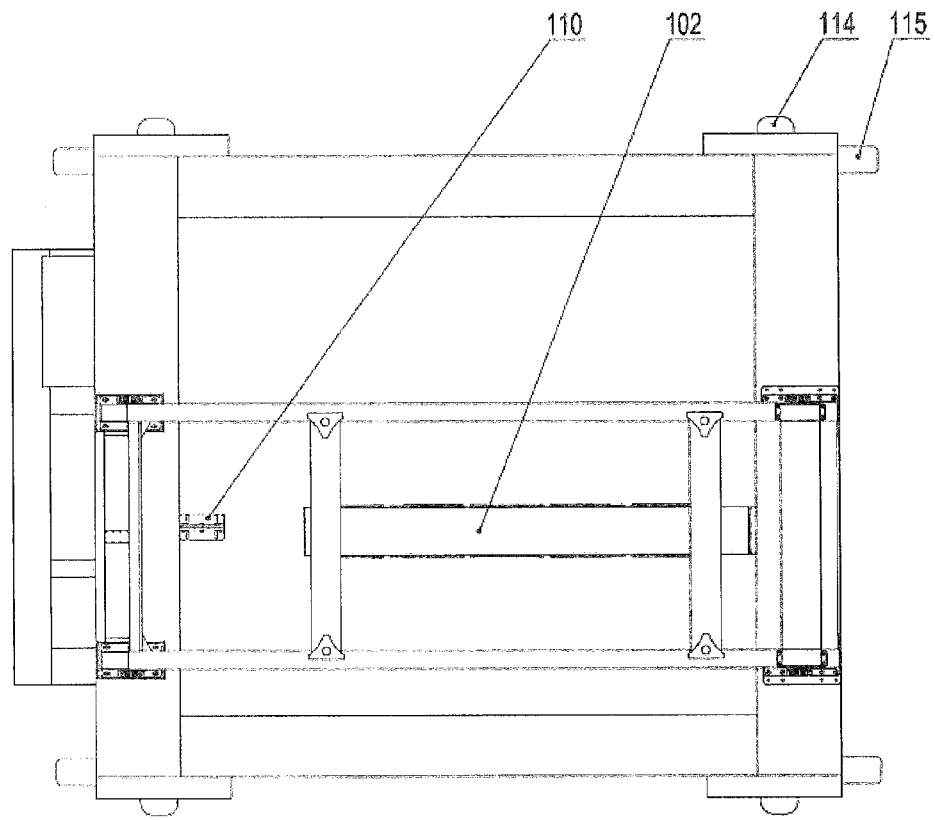
FIG. 4 is a top view of the inspection system of FIG. 2.

As shown in FIGS. 2-4, the radiation source 112 of the inspection system in accordance with the present invention can be an accelerator, to provide the X-rays. Of course, it can also be other forms of radiation sources. Herein, the detector is composed of a transversal detector arm 102 and a longitudinal detector arm 105, and can also be other types of detectors.

Figure 20:
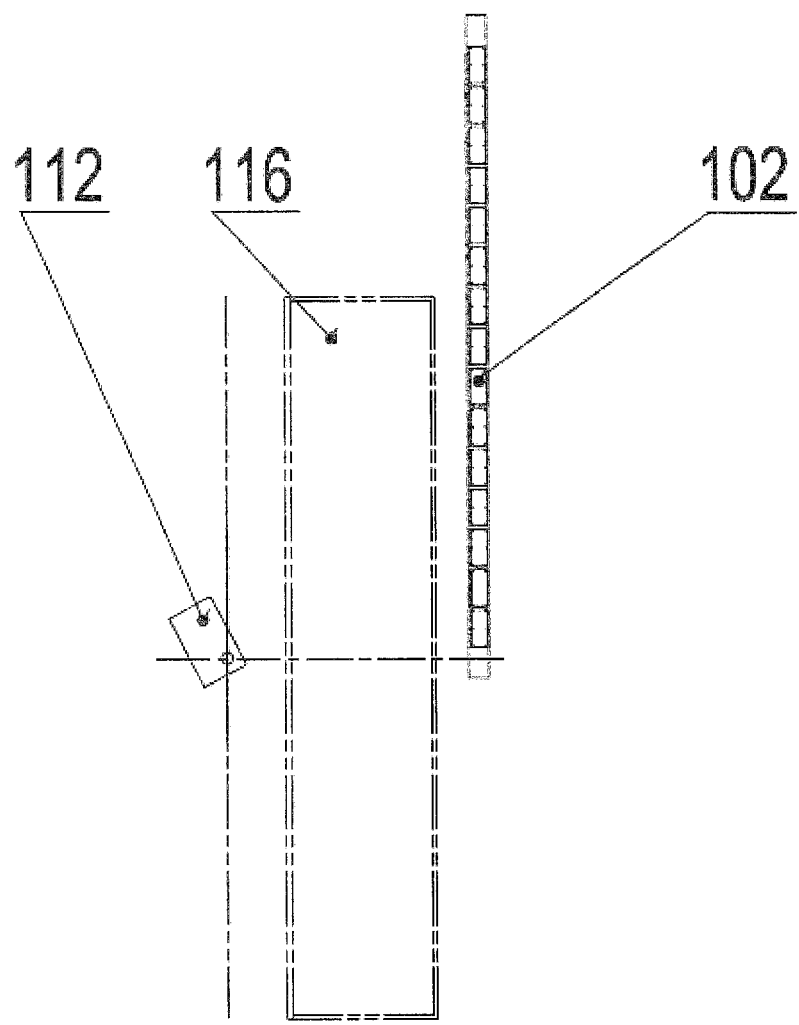
FIG. 20 is a schematic view of the inspection system of FIG. 19.
Figure 26:
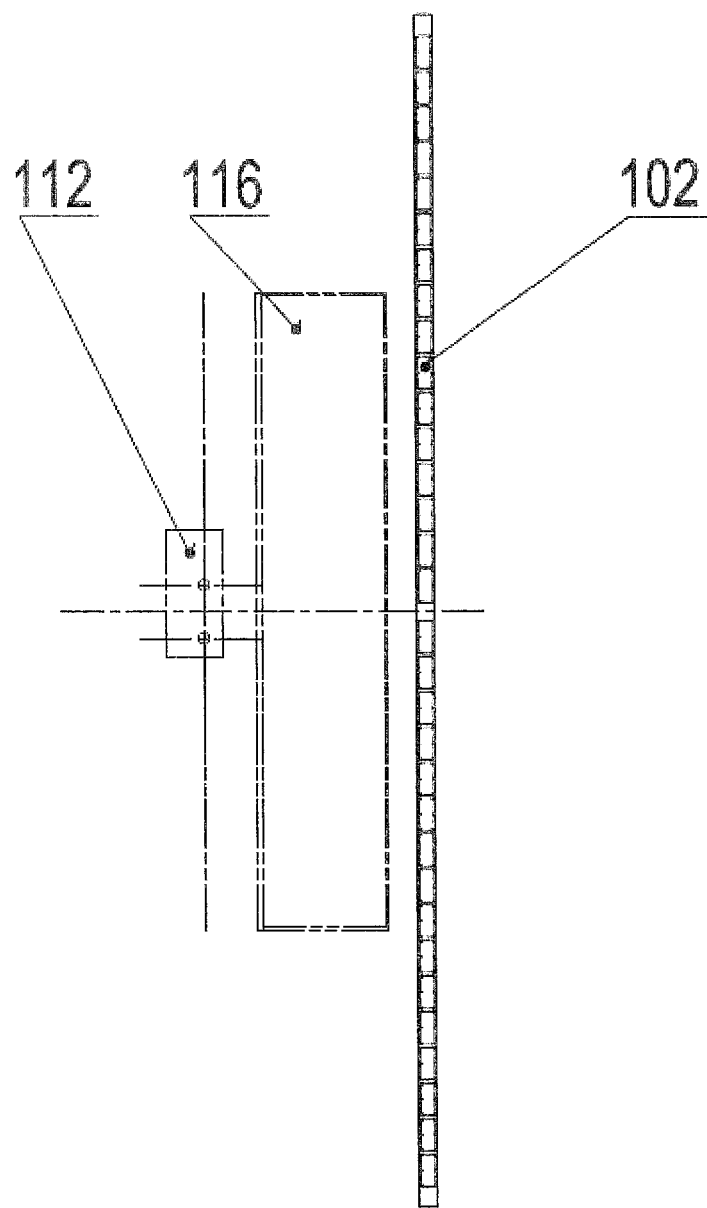
FIG. 26 is a schematic view of the inspection system of FIG. 13.

In accordance with one implementation of the present invention, the radiation source 112 has one target or two targets for generating the X-rays. The irradiation source 112 can generate single energy X-rays or dual energy X-rays. For example, FIG. 20 shows a radiation source having one single target, and FIG. 26 shows a radiation source having two targets.

As shown in FIG. 2, the body of the inspection system is a movable vehicle body. The inspection system includes a travel driving device 115. As shown in FIG. 3, it includes travel wheels 114. Both of them can drive and move the inspection system, so that the inspection system moves relative to the container 116, so as to inspect the container 116 within a scanning space 119.

As shown in FIGS. 2-4, the movable vehicle body includes a frame, a height of which is adjusted depending on a height of the container. The detector includes a transversal detector arm 102 located on a transversal upper portion of the frame, and a longitudinal detector arm 105 located on a longitudinal side of the frame. Further, the radiation source 112 is provided on another longitudinal side of the frame.

As shown in FIGS. 2-3, the inspection system includes a detector driving device. Specifically, the detector deriving device includes a lifting driving device 103 for the detector arm and a deflection driving device 104 for the detector arm, which respectively drive the detector arm to be lifted and deflected. The inspection system further includes a radiation source driving device, which includes a radiation source lifting driving device 111 and a radiation source deflection driving device 109. They are respectively used to drive the radiation source to be lifted and to be deflected by a small angle around a gyration centre, so that the X-rays are angled with the container.

The inspection system in accordance with the present invention also includes other members: such as an operation room 101, a speed sensor 117, a position sensor 118, a collimator 110, a control cabinet 108, a radioactive matter detection system 113 and a container number recognition system 106. The person skilled in the art can dispose the above members as appropriate. In addition, the person skilled in the art can provide other members except the above members, as required. Of course, the structures as shown can be modified. However, the above modifications all fall within the scope of the present invention.

For example, the above described radioactive matter detection system 113 can detect whether there is the radioactive matter within the container; and the container number recognition system 106 can recognize the number of the container.

A shield layer can be provided within the operation room 101, and is used to shield the X-rays, so as to protect the operator and prevent the harm to the operator upon being exposed to the X-rays. The operator can control the inspection system within the operation room, and also can control it by remote control.

Figure 5:
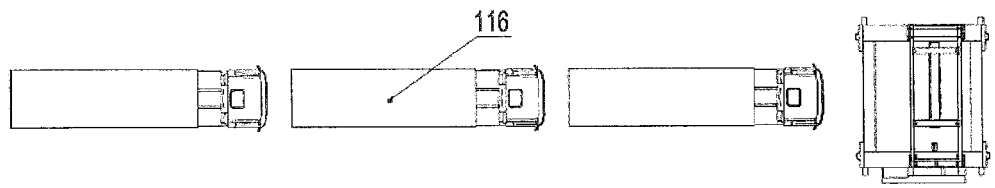
FIG. 5 is a schematic view of scanning the containers with the inspection system of FIG. 2.
Figure 6:
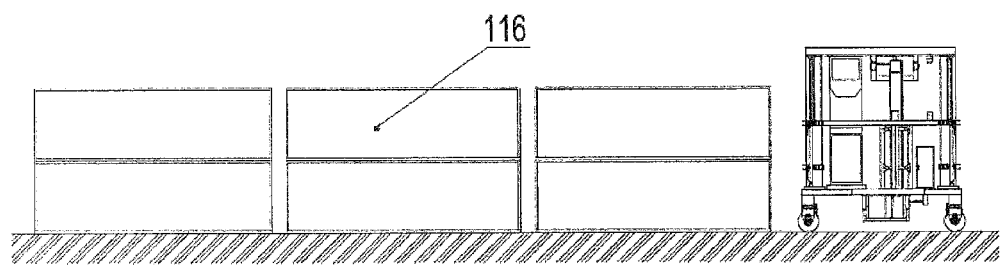
FIG. 6 is a schematic view of scanning the containers with the inspection system of FIG. 2.

FIG. 5 is a schematic view of scanning the container with the inspection system of FIG. 2, and FIG. 6 is a schematic view of scanning the container with the inspection system of FIG. 2. As shown in FIG. 5, the inspection system in accordance with the present invention is stationary, and the automobile vehicle carries the containers 116 through the inspection system, so as to perform the subsequent inspection. As shown in FIG. 6, the inspection system in accordance with the present invention is movable, and moves over the container, so as to inspect the container 116.

Figure 7:
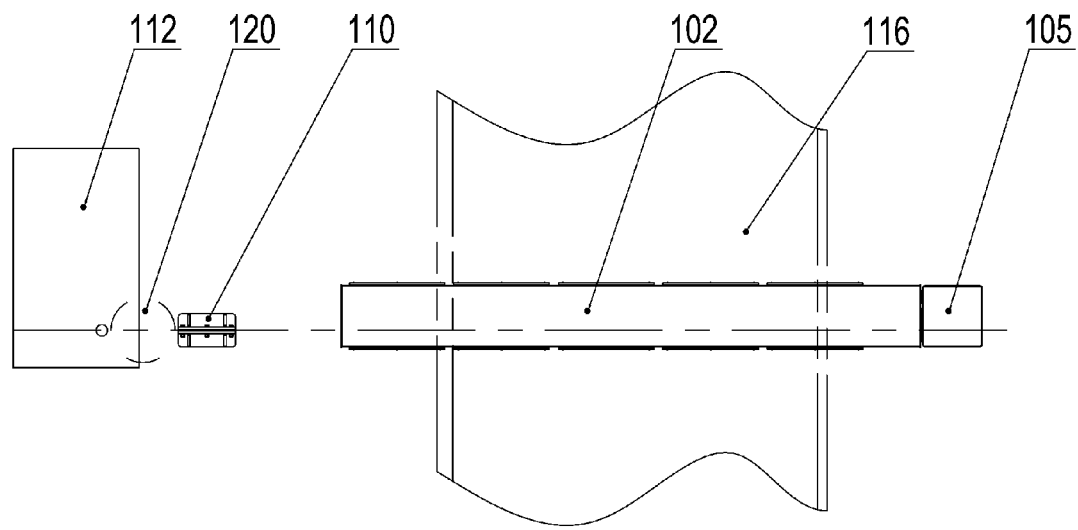
FIG. 7 is a schematic view of scanning the containers with the inspection system of FIG. 2 while an imaging system being in a normal position.
Figure 8:
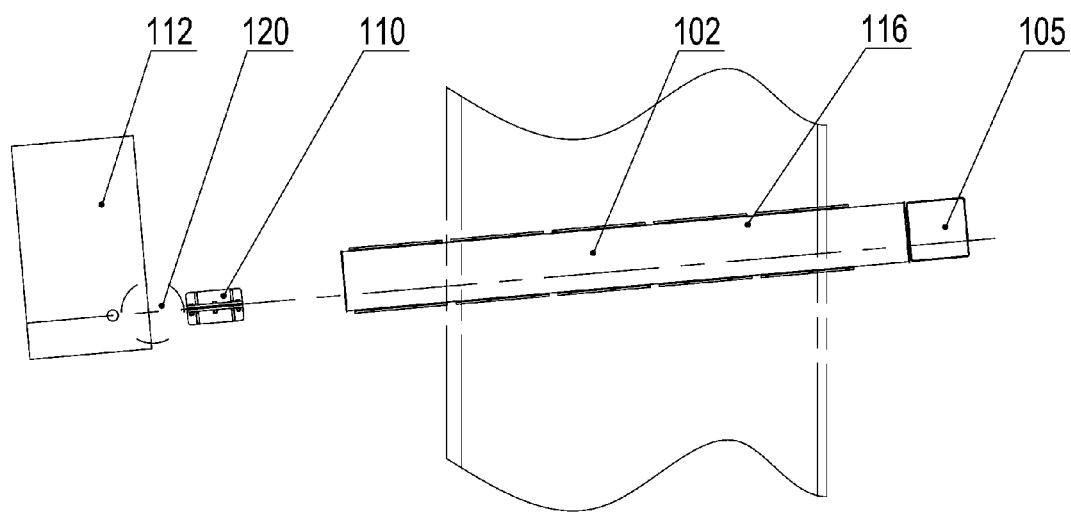
FIG. 8 is a schematic view of scanning the container after the imaging system of the inspection system of FIG. 2 is deflected by a small angle.

FIG. 7 is a schematic view of scanning the container with the imaging system of the inspection system of FIG. 2 in a normal position; and FIG. 8 is a schematic view of scanning the container after the imaging system of the inspection system of FIG. 2 is deflected by a small angle. For sake of clarity, FIGS. 7 and 8 omit a part of structures of the inspection system. As shown in FIG. 7, the scanning to the container is done when the radiation source 112 and the detector arms 102, 105 are located at a position not rotated with respect to the gyration centre. As shown in FIG. 8, the scanning to the container is performed, when the radiation source 112 and the detector arms 102, 105 are located at a position rotated by a small angle with respect to the gyration centre, where the X-rays can transmit through the suspicious object in different angles so as to avoid the missing inspection.

Figure 9:
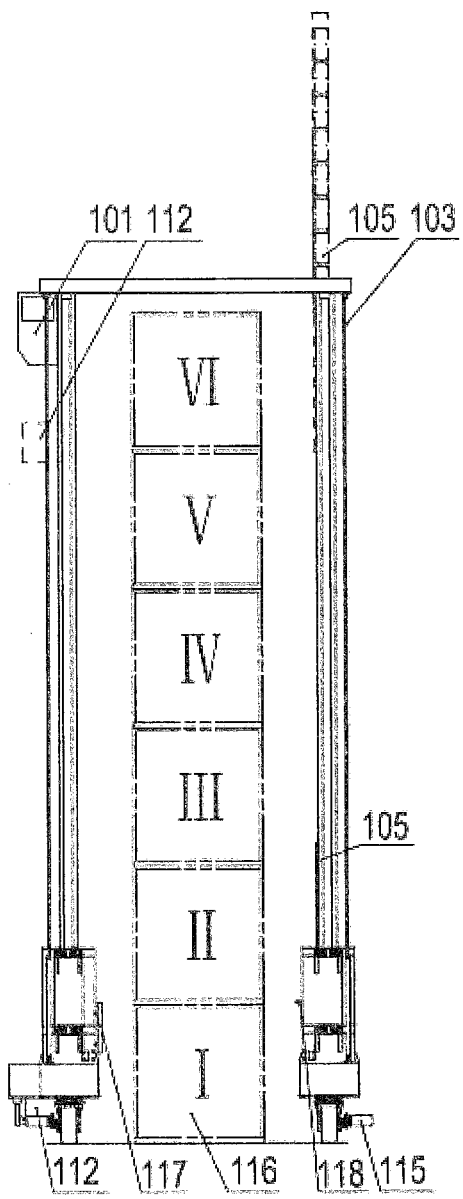
FIG. 9 is a front view of an inspection system in accordance with another embodiment of the present invention.

FIG. 9 is a front view of an inspection system in accordance with another embodiment of the present invention. With reference to FIG. 9, it has the following differences from the embodiment shown in FIG. 2 in that it is used to scan the container having a plurality of layers, for instance, from a layer I to a layer VI. In the present embodiment, the same reference numbers as those in the embodiment of FIG. 2 indicate the same components. In the embodiment of FIG. 9, the inspection system only includes a longitudinal detector 105, without the transversal detector 102. This is different from the embodiment of FIG. 2.

Specifically, as shown in FIG. 9, the detector has a longitudinal detector 105, which is provided on a longitudinal side of a frame of the inspection system. The radiation source 112 is provided on another longitudinal side of the frame. During the inspection, the container lies between the two longitudinal sides.

As shown in FIG. 9, the inspection system in accordance with the present invention can inspect the container in batches, that is, in a process of moving the radiation source and the detector from bottom to top, a scanning from the layer I to layer VI of the container is performed.

Figure 10:
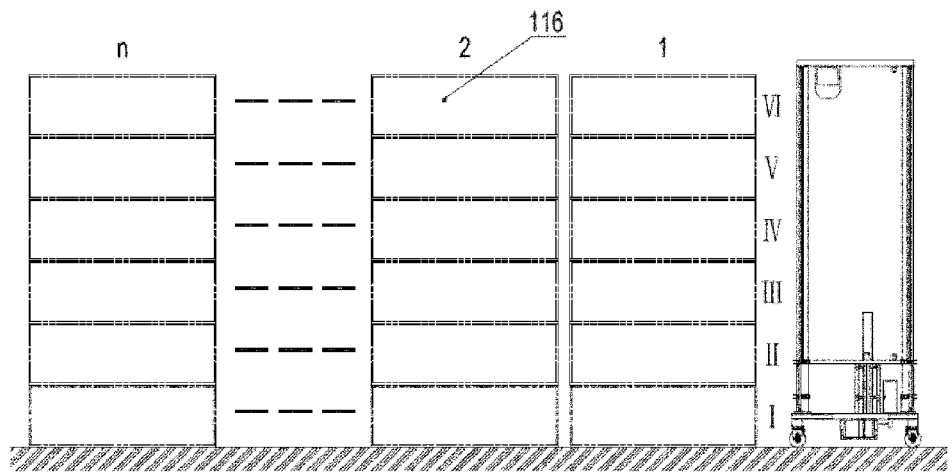
FIG. 10 is a schematic view of scanning the container with the inspection system of FIG. 9.

FIG. 10 is a schematic view of scanning the container with the inspection system of FIG. 9. Different layers of the container can be scanned by moving the radiation source and the detector to different heights. A frame of the inspection system can reach a topmost container in the container stack, so that the inspection system is capable of inspecting the topmost container.

Figure 11:
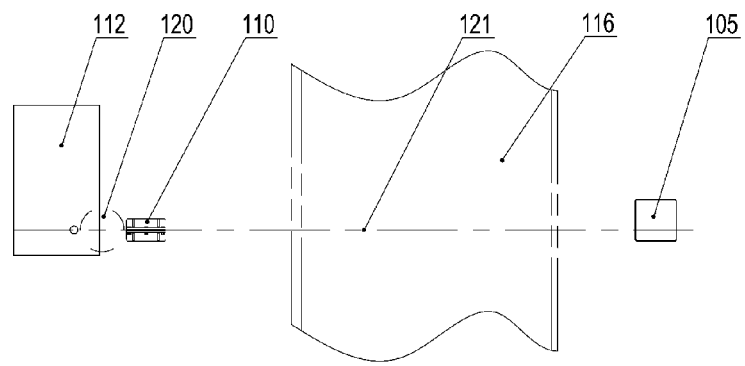
FIG. 11 is a schematic view of scanning the container while the imaging system of the inspection system of FIG. 9 is in a normal position.
Figure 12:
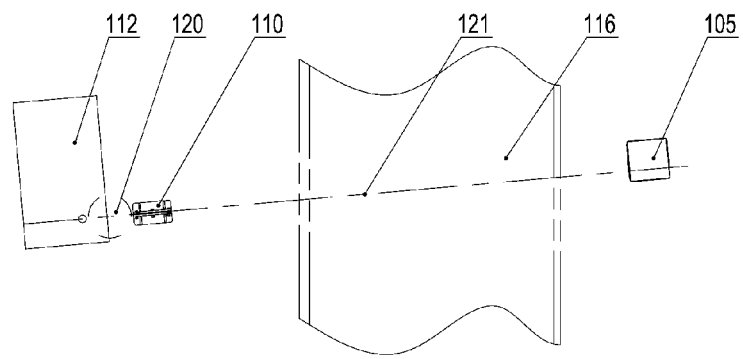
FIG. 12 is a schematic view of scanning the container after the imaging system of the inspection system of FIG. 9 is deflected by a small angle.

Similar to the embodiment of FIG. 2, FIG. 11 is a schematic view of scanning the container with the imaging system of the inspection system of FIG. 9 in a normal position; and FIG. 12 is a schematic view of scanning the container with the imaging system of the inspection system of FIG. 9 after it is deflected by a small angle. As shown in FIG. 11, the scanning to the container is done when the radiation source 112 and the detector arm 105 are located at a position not rotated with respect to the gyration centre. As shown in FIG. 12, the scanning to the container is performed, when the radiation source 112 and the detector arm 105 are located at a position rotated by a small angle with respect to the gyration centre, where the X-rays can transmit through the suspicious object in different angles so as to avoid the missing inspection.

Figure 13:
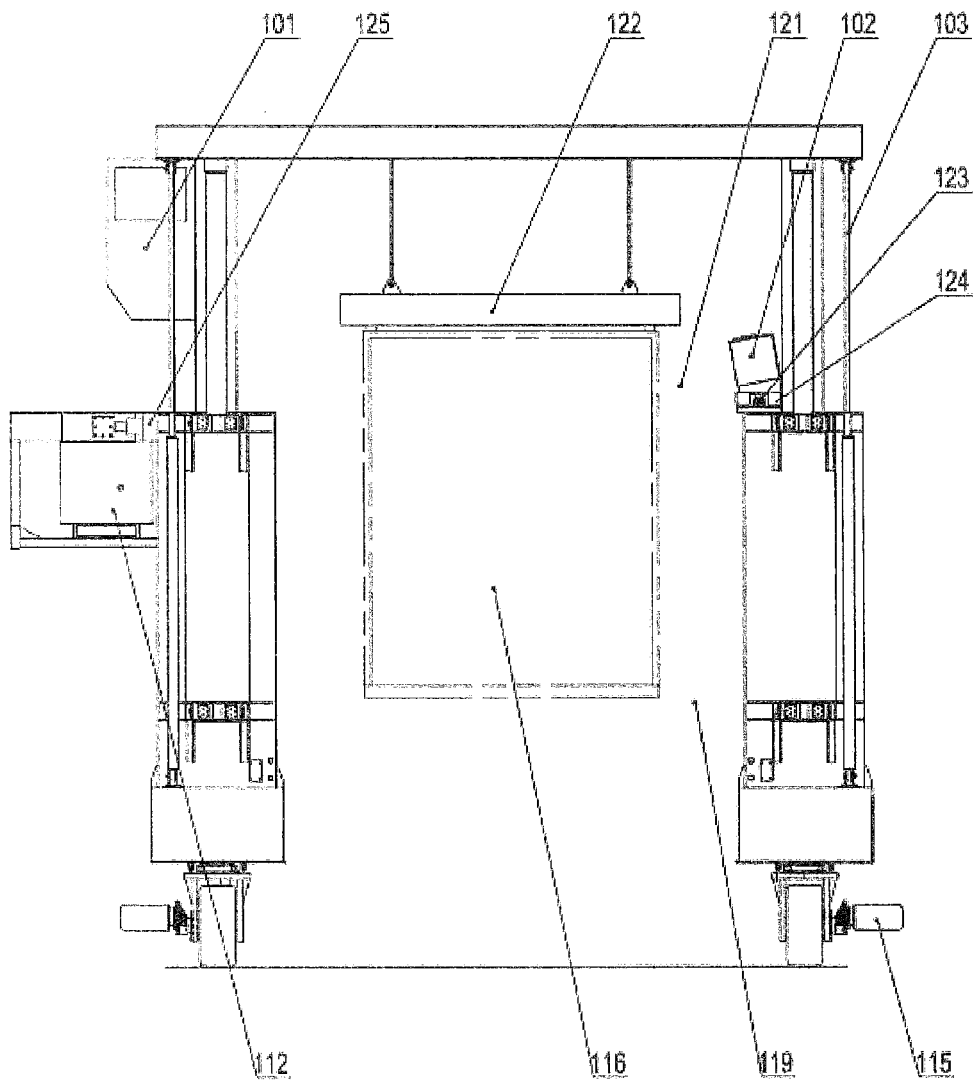
FIG. 13 is a front view of an inspection system in accordance with a further embodiment of the present invention.
Figure 14:
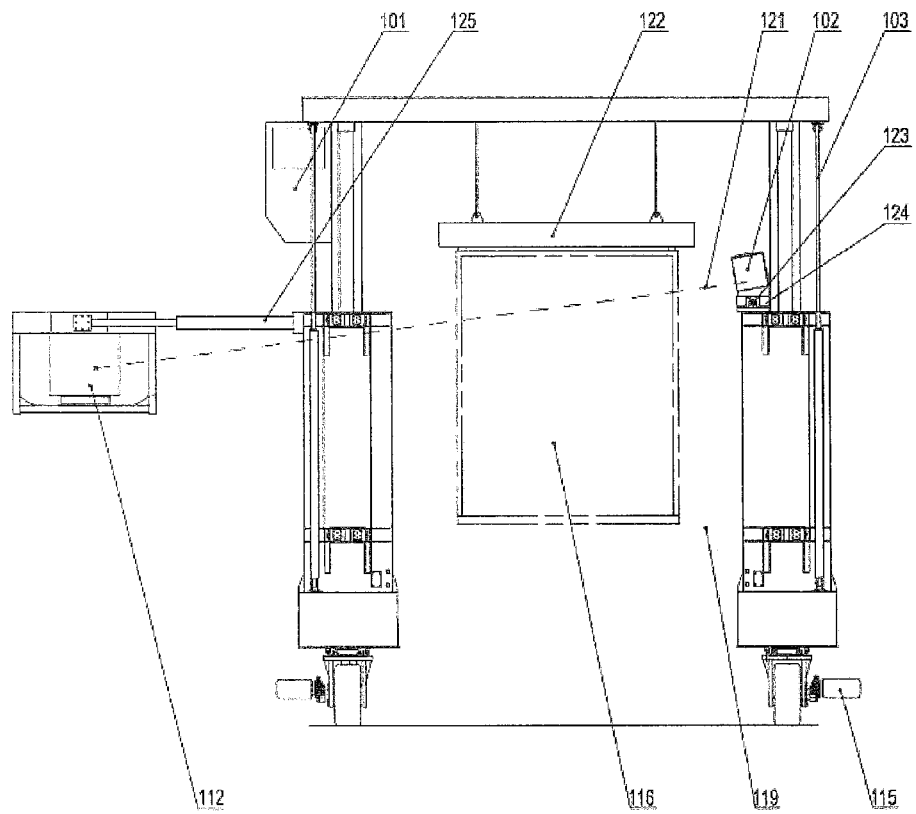
FIG. 14 is a front view of an inspection system in accordance with a yet further embodiment of the present invention.

FIGS. 13 and 14 are respectively front views of an inspection system in accordance with further embodiments of the present invention. The difference of FIG. 13 from FIG. 14 lies in that the radiation source 112 of FIG. 13 is in a retracted position while the radiation source 112 of FIG. 14 is in an extended position.

Figure 15:
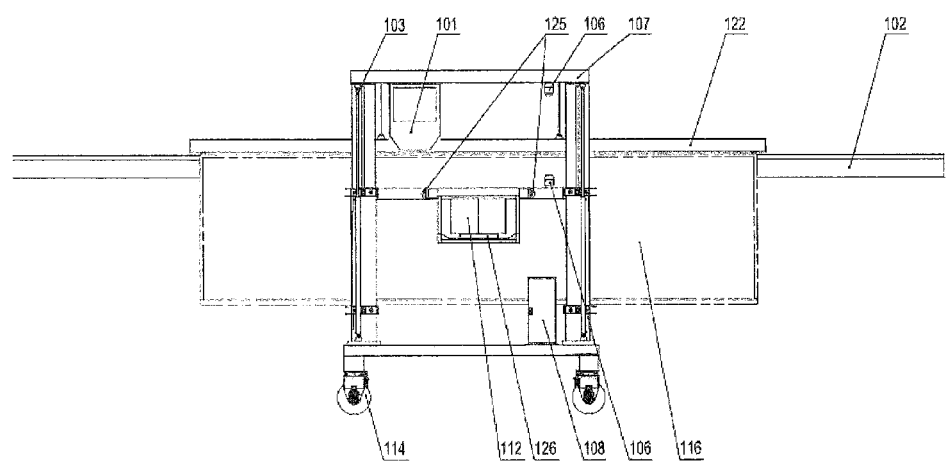
FIG. 15 is a side view of the inspection system of FIG. 13.

As shown in FIGS. 13-17, the inspection system further includes a crane device 122, which is different from the embodiment of FIG. 2. The crane device 122 is disposed to move the container along a height direction of the frame. The detector has a transversal detector 102, which is positioned at a longitudinal side of the frame. As shown in FIGS. 13 and 15, an extending direction of the transversal detector is perpendicular to the height direction of the frame, and the radiation source 112 is positioned at another longitudinal side of the frame. During the inspection process, the container is located between the two longitudinal sides.

In this embodiment, the same reference numbers as those in the embodiment of FIG. 2 indicate the identical components.

Figure 17:
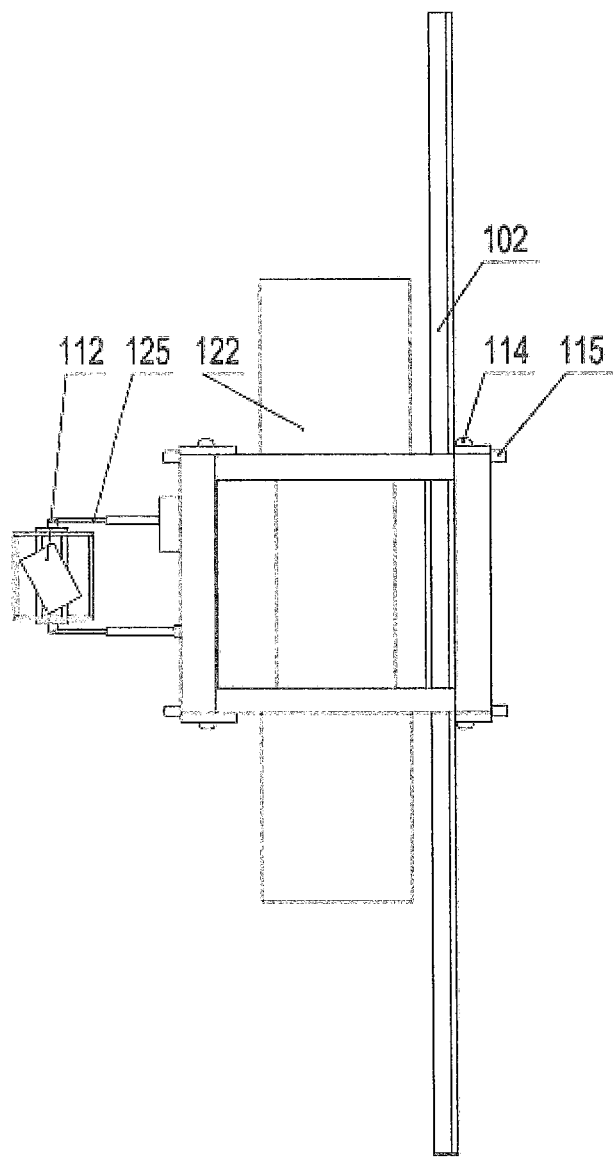
FIG. 17 is a top view of the inspection system of FIG. 14.
Figure 18:
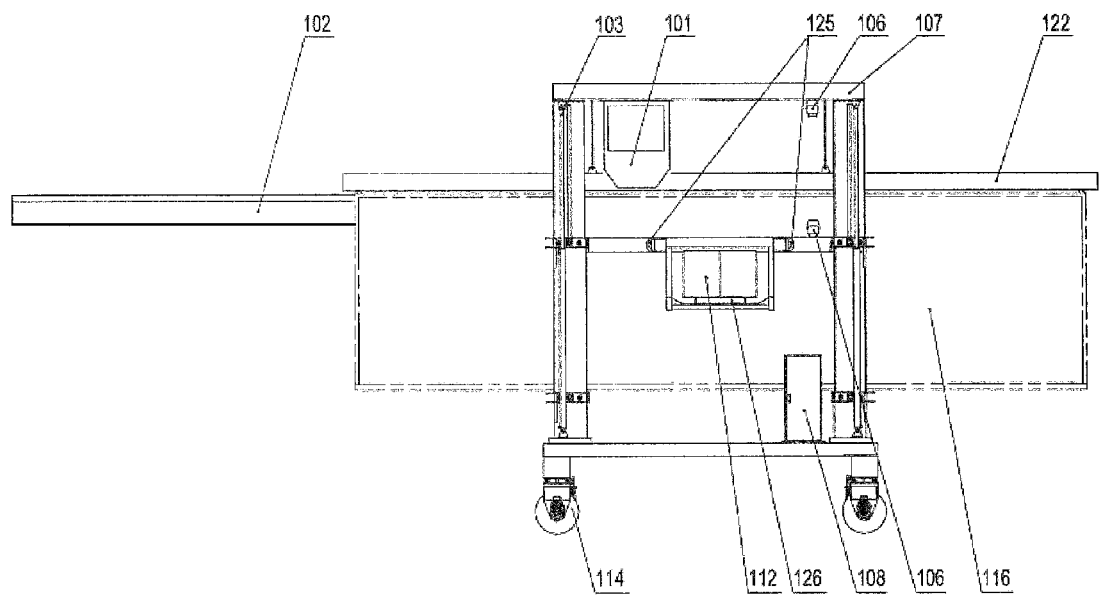
FIG. 18 is a side view of a variant of the inspection system of FIG. 13.
Figure 19:
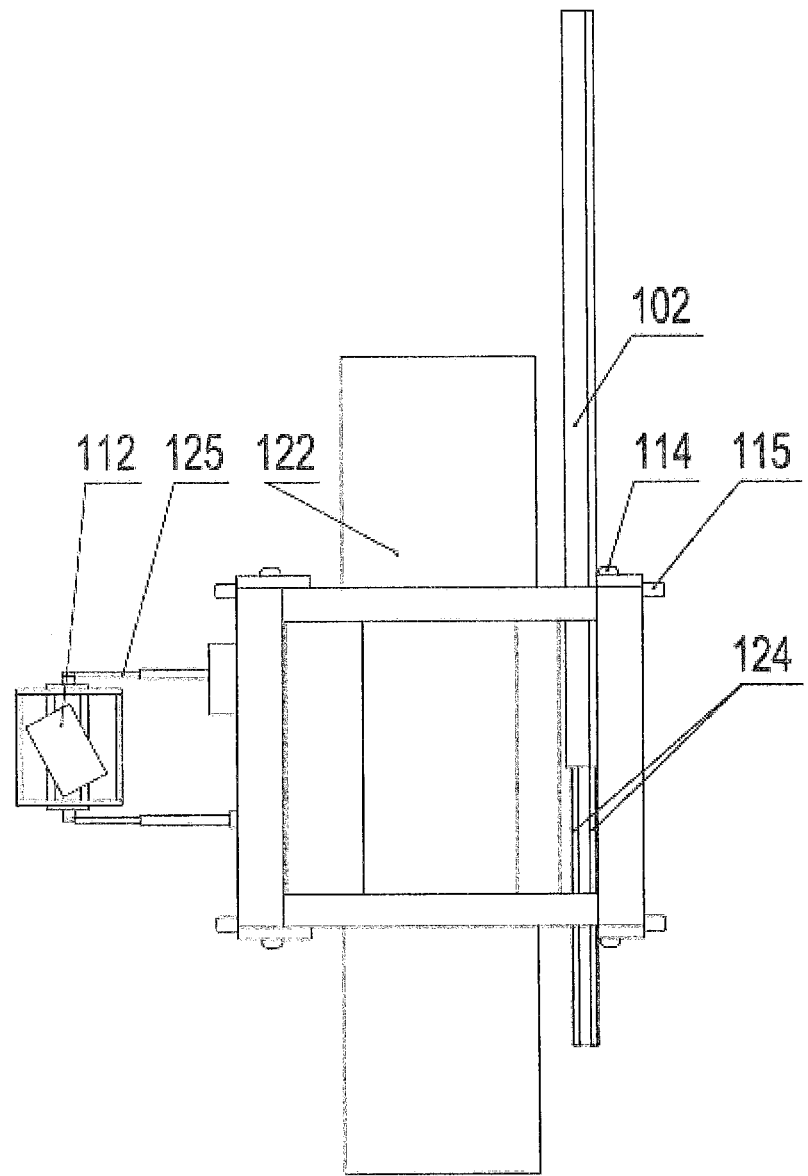
FIG. 19 is a top view of the inspection system of FIG. 18.

FIG. 17 shows a variant of the embodiment, and FIG. 18 shows another variant of the embodiment. As shown in FIG. 17, the transversal detector 102 has a length which is configured to receive the X-rays transmitting through an entire length of the container. As shown in FIG. 18, the transversal detector 102 has a length which is configured to receive the X-rays transmitting through half a length of the container.

Figure 16:
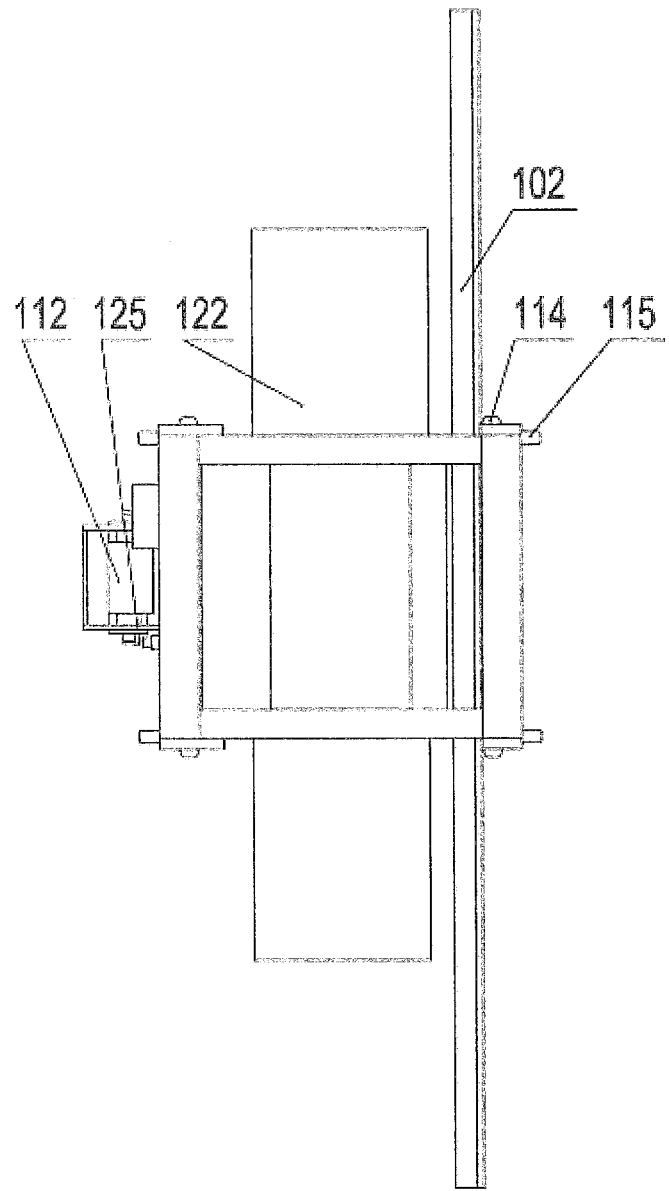
FIG. 16 is a top view of the inspection system of FIG. 13.
Figure 23:
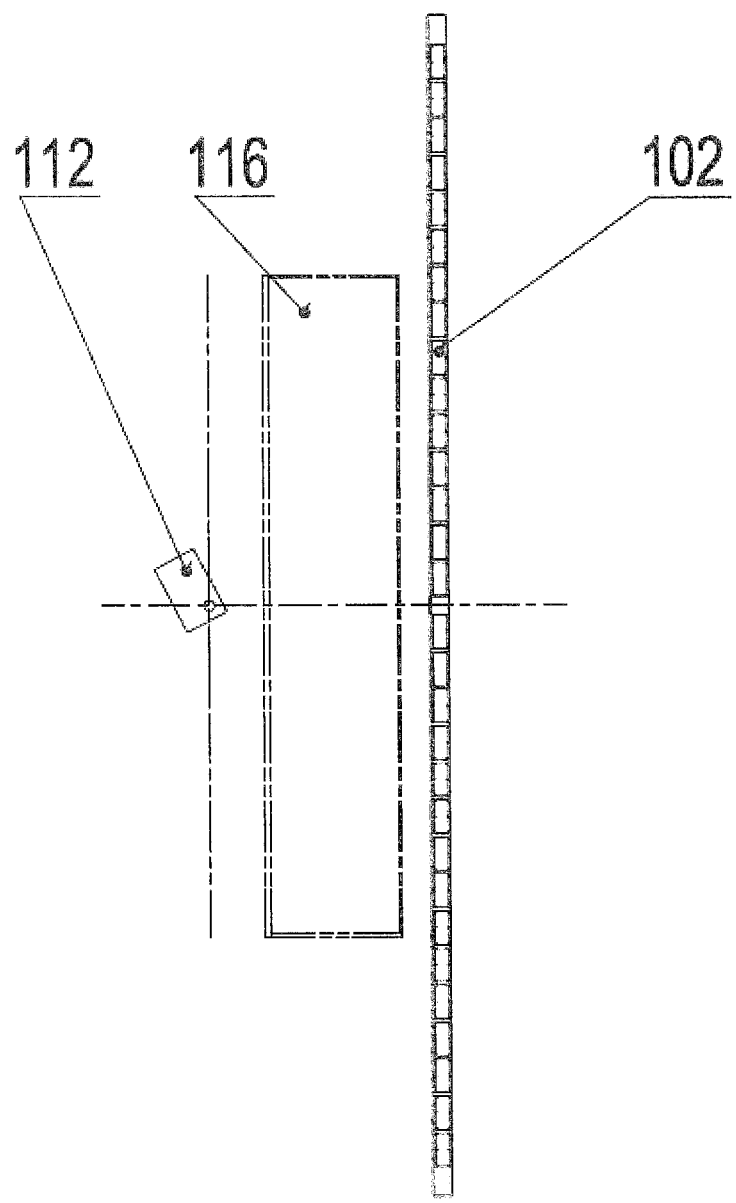
FIG. 23 is a schematic view of scanning the container with the inspection system of FIG. 13.

The inspection systems as shown in FIGS. 15-17 and FIGS. 23-27 have the transversal detectors 102, the length of which is configured to receive the X-rays transmitting through the entire length of the container. The radiation sources in FIGS. 16, 23, 26 are in a retracted position, and the radiation sources in FIGS. 17, 24, 25, 27 are in an extended position. The radiation source having two targets is used in FIGS. 26 and 27. The radiation source having a single target is used in FIGS. 23-25.

Figure 21:
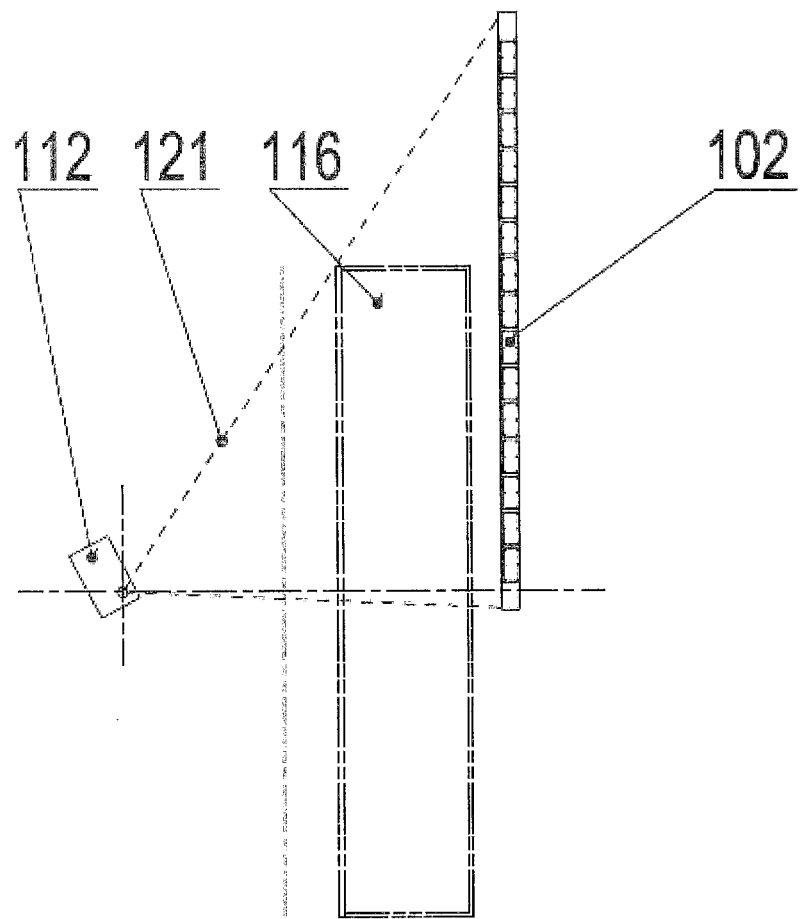
FIG. 21 is a schematic view of scanning the container with the inspection system of FIG. 19.
Figure 22:
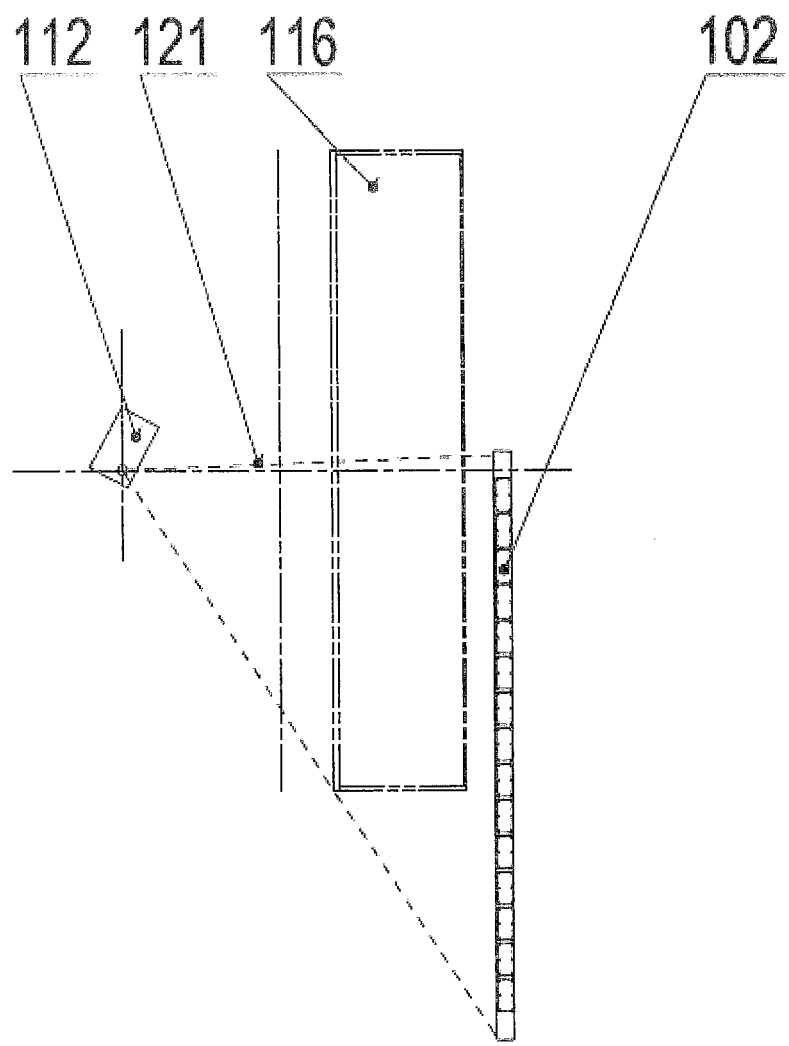
FIG. 22 is a schematic view of scanning the container with the inspection system of FIG. 19.

The inspection systems as shown in FIGS. 18-22 have the transversal detectors 102, the length of which is configured to receive the X-rays transmitting through half the length of the container. The radiation source in FIG. 20 is in a retracted position, and the radiation sources in FIGS. 21, 22 are in an extended position. The radiation source having a single target is used in FIGS. 20-22.

As shown in FIGS. 13-14, a slide rail 124 is provided onto a frame of the inspection system, and extends along the direction of the transversal detector 103. Therefore, the transversal detector 103 is provided to move along the slide rail 124. The inspection system further includes a radiation source driving device and a detector driving device 123, which drives the transversal detector to move along the slide rail. In particular, the radiation source driving device includes a radiation source translation driving device 125 and a rotation driving device 126, which respectively drive the radiation to translate or rotate in a fixed angle.

As shown in FIG. 14, the radiation source 112 provides the X-rays 121 to scan the container 116. During the scanning process, the lifting and descending operations of the container 116 are performed by means of the crane device 122, thereby achieving a complete scan to the container.

As shown in FIGS. 20-27, the scanning to the container is performed when the radiation source is in the retracted position and in the extended position. They also illustrate the embodiments of the transversal detector arms having different lengths, and the embodiments of the radiation sources having the single target and the multiple targets.

As shown in FIGS. 20-21, the length of the transversal detector arm 102 can be set to receive the X-rays transmitting through half the length of the container. As shown in FIG. 20, during the scanning process, a half of the container 116 is firstly scanned; and as shown in FIG. 21, after finishing the scanning step shown in FIG. 20, the remaining half of the container is scanned by adjusting the positions of the transversal detector arm 102 and the radiation source 112. Therefore, an entire scanning of the container is obtained.

Figure 24:
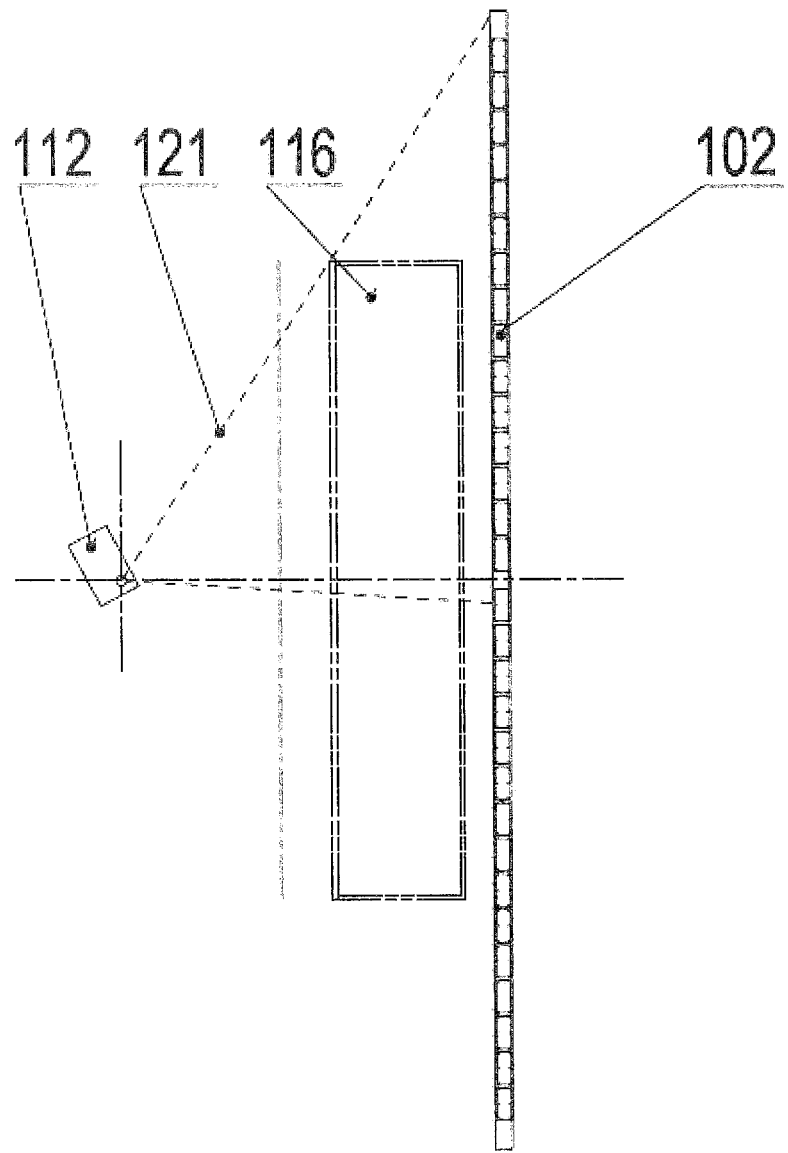
FIG. 24 is a schematic view of scanning the container with the inspection system of FIG. 13.
Figure 25:
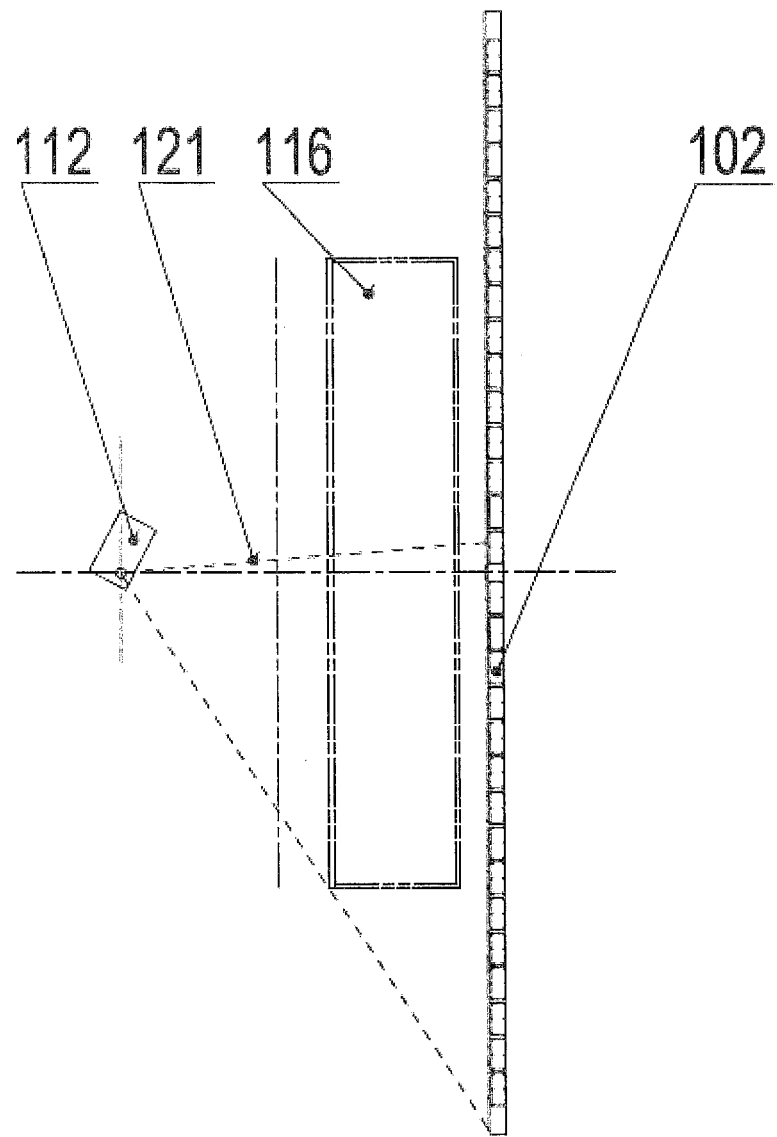
FIG. 25 is a schematic view of scanning the container with the inspection system of FIG. 13.

Similarly, FIGS. 23-25 show schematic views of scanning the container with the radiation source and the transversal detector arm having variant structures. During the scanning process as described above, a half of the container is scanned during the ascending process of the container and the remaining half of the container is scanned during the descending process of the container. It should be understood that the person skilled in the art can change the above described structures and scanning modes as appropriate, in accordance with the actual working requirements.

Figure 27:
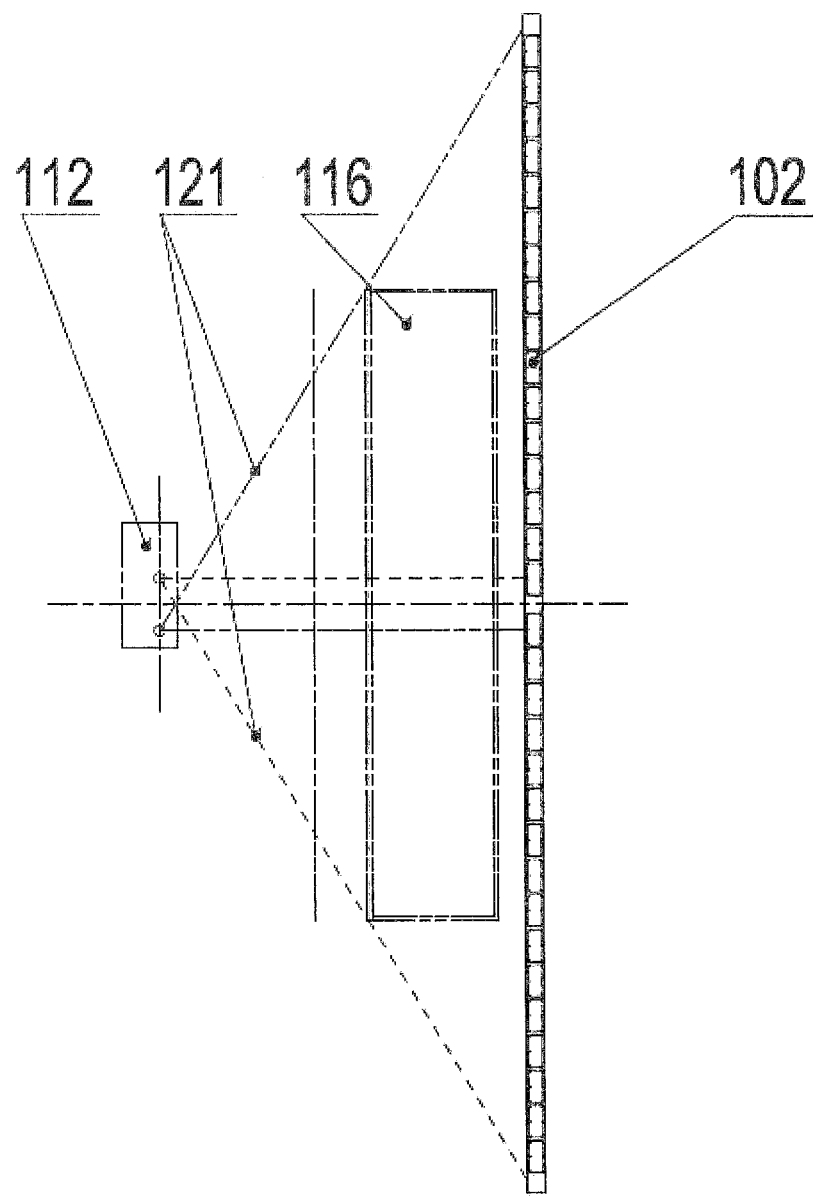
FIG. 27 is a schematic view of the inspection system of FIG. 14.

In the embodiments shown by FIGS. 26-27, the scanning inspection to the entire length of the container can be finished during one ascending or descending process of the container, since the radiation source thereof takes the form of two targets.

Although the present invention has been explained with reference to the drawings, the embodiments shown in the drawings are only illustrative, instead of limiting the present invention. Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

The invention claimed is:

1. An inspection system for a container, comprising:
    an X-ray radiation source, providing X-rays for scanning the container;
    X-ray detectors, receiving the X-rays emitted from the radiation source;
    a body of the inspection system, on which the radiation source and the detectors are provided;
    a radiation source deflection driving device and a detector deflection driving device, which respectively drive the radiation source and the detector to deflect by a small angle around a gyration centre, so that the X-rays is angled with the container;
    wherein a size of the body of the inspection system is set to facilitate the inspection of the container;
    wherein the body of the inspection system is a movable vehicle body;
    wherein the X-ray radiation source is configured to be switched between in a retracted position and in an extended position;
    the movable vehicle body comprises a frame, a height of which is adjusted depending on a height of the container;
    the detectors comprise: a transversal detector arm located on a transversal upper portion of the frame and on which a plurality of first X-ray detectors are disposed, and a longitudinal detector arm located on a longitudinal side of the frame and on which a plurality of second X-ray detectors are disposed; and
    the radiation source is provided on another longitudinal side of the frame.

2. The inspection system of claim 1, further comprising
    a movable driving device, provided on the frame and driving and move the movable vehicle body to move;
    a radiation source driving device, provided on the frame and driving the radiation source to move along a height direction of the frame; and
    a detector driving device, provided on the frame and driving the detector to move along the height direction of the frame.

3. The inspection system of claim 1, wherein
    the movable vehicle body comprises a frame;
    the detector is a longitudinal detector, which is located at a longitudinal side of the frame, the radiation source is located at another longitudinal side of the frame, during the inspection process, the container is located between the two longitudinal sides.

4. The inspection system of claim 3, further comprising
a movable driving device, provided on the frame and driving and move the movable vehicle body;
a radiation source driving device, provided on the frame and driving the radiation source to move along a height direction of the frame; and
a detector driving device, provided on the frame and driving the detector to move along the height direction of the frame.

5. The inspection system of claim 3, wherein the frame reaches a topmost container position in a container stack along a longitudinal direction, so that the inspection system inspects the container stacked at the topmost container position of the container stack.

6. The inspection system of 1; wherein
the movable vehicle body comprises
a frame, and
a crane device, moving the container along a height direction of the frame;
the detector is a transversal detector, which is provided at a longitudinal side of the frame, an extending direction of the transversal detector is perpendicular to the height direction of the frame,
the radiation source is located at another longitudinal side of the frame,
during the inspection process, the container is located between the two longitudinal sides.

7. The inspection system of claim 6, wherein
the frame is provided with a slide rail, which extends along a direction of the transversal detector, and the transversal detector is movable along the slide rail.

8. The inspection system of claim 6, further comprising
a movable driving device, provided on the frame and driving and move the movable vehicle body to move;
a radiation source driving device, provided on the frame and driving the radiation source to move; and
a detector driving device, provided on the frame and driving the detector to move,
wherein the detector driving device drives the transversal detector to move along the slide rail.

9. The inspection system of claim 8, wherein
the radiation source driving device is provided to drive the radiation source to rotate in a fixed angle.

10. The inspection system of claim 6, wherein
a length of the transversal detector is sized to receive the X-rays transmitting through an entire length of the container.

11. The inspection system of claim 6, wherein
a length of the transversal detector is sized to receive the X-rays transmitting through half a length of the container.

12. The inspection system of claim 1, wherein
the radiation source has one target or two targets for generating X-rays.

13. The inspection system of claim 1, wherein
the radiation source generates single energy rays or dual energy rays.

* * * * *